United States Patent Office.

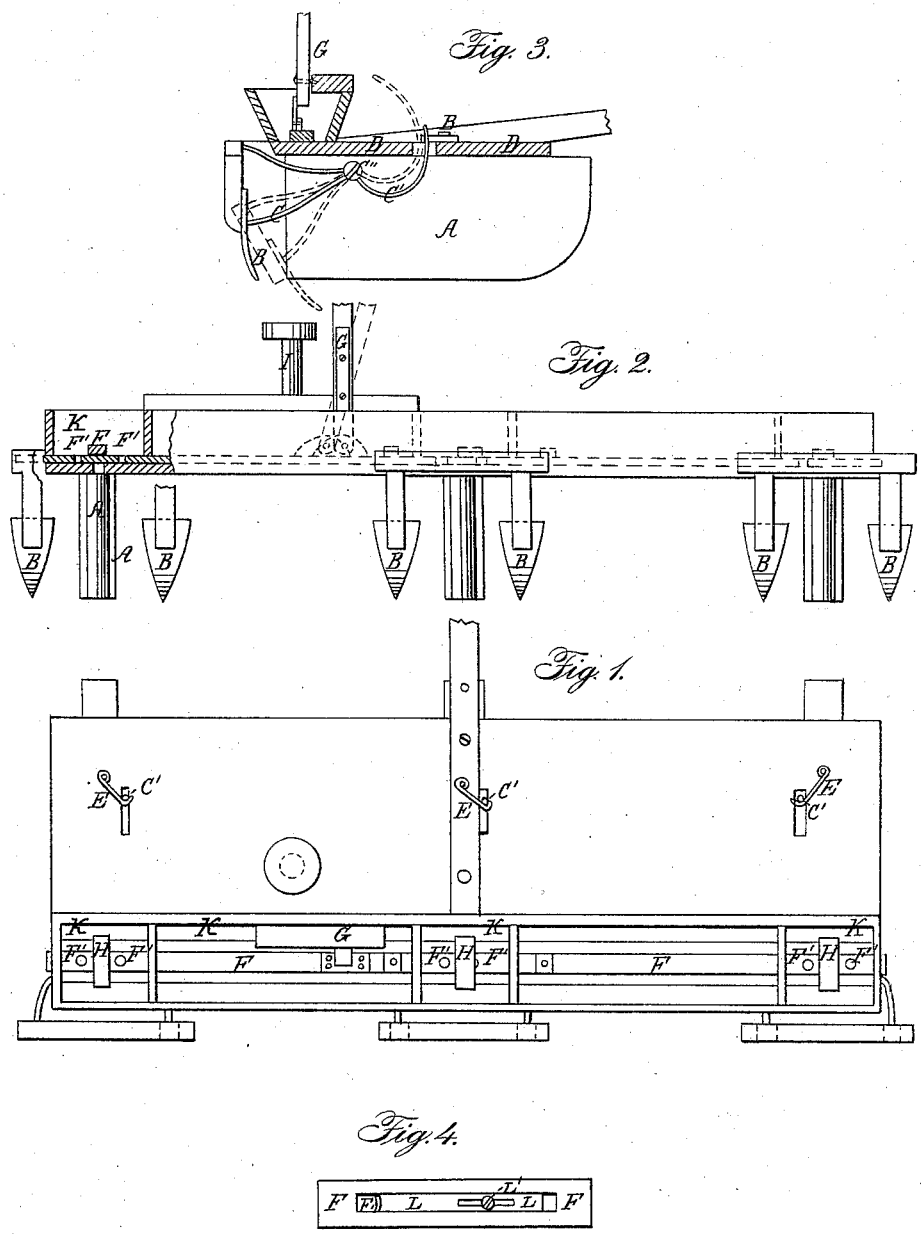

JOSEPH L. MANLOVE, OF CONNERSVILLE, INDIANA.

Letters Patent No. 70,100, dated October 22, 1867.

IMPROVEMENT IN SEED-PLANTER.

*The Schedule referred to in these Letters Patent and making part of the same.*

TO ALL WHOM IT MAY CONCERN:

Be it known that I, JOSEPH L. MANLOVE, of Connersville, in the county of Fayette, and State of Indiana, have invented a new and useful Improvement in Seed-Planters; and I do hereby declare that the following is a full, clear, and exact description of the same, reference being had to the annexed drawings, making part of this specification, in which—

Figure 1 is a plan.

Figure 2, an end elevation partly in section.

Figure 3, a vertical transverse section.

Figure 4, a plan showing the adjustable opening in the slide.

The same letters are employed in all the figures to indicate parts which are identical.

The following description will enable one skilled in the art to manufacture my improved seed-planter.

A are the furrowing-runners for marking out furrows in which the seed is to be deposited. A groove is cut in the end of the runner at A', through which the grains of seed fall into the ground, where they are covered immediately by the two shovels B B, set to throw the earth from each side over the grain. These shovels are not fixed upon stationary standards, but are attached to a frame supported by the braces C, which are pivoted to the runners on each side at $C^2$, playing freely upon their pivots, and kept in the earth by their own gravity, and easily thrown up by any obstruction they may encounter. The brace C is extended on one side by the arm $C^1$, which is curved up, passing up through the board D, which connects the furrowing-runners and supports the seat I. The lever $C^1$ is intended to be used for the purpose of raising the shovels B out of the ground, in which position they are held by a hook or equivalent device, E. The shovels are to be thus raised when the machine is used for the first furrowing out across the field preparatory to planting. The machine is arranged to plant or furrow out three rows at the same time. The seed is placed in a hopper on the rear of the furrowing-runners, and is dropped by means of the slide F, which runs longitudinally with the box, having a reciprocating motion communicated to it by means of the lever G, actuated by hand, the operator sitting upon the seat I. There is in each hopper-box K, a cross-piece, H, over the slide F, so arranged that one of the holes F' shall always be under the seed to receive it, and carry it to an opening under the cross-piece H, through which it falls into the furrow. The holes F' in the slide are made adjustable as to their size by means of a sliding-piece, L, set in the slide F, so that they may be adapted to the character of the grain, and the number of grains intended to be dropped. The sliding-piece L is held in position by a set-screw, L'.

What I claim as my invention, and desire to secure by Letters Patent, is—

1. The combination of the furrowing-runners A, shovels B, oscillating braces C, lever $C^1$ and a hook, or other equivalent fastening, E, for the same, arranged to operate substantially as set forth.

2. In combination with the foregoing parts for covering the seed, the hoppers K, slide F, with adjustable openings F', and cross-piece H, arranged to operate substantially as set forth.

In testimony whereof I have signed my name to this specification in the presence of two subscribing witnesses.

JOS. L. MANLOVE.

Witnesses:
W. H. BECK,
JAMES C. McINTOSH.